(12) United States Patent
Jung

(10) Patent No.: US 9,875,737 B2
(45) Date of Patent: Jan. 23, 2018

(54) PRE-TRAINING APPARATUS AND METHOD FOR SPEECH RECOGNITION

(71) Applicant: ELECTRONICS AND TELECOMMUNICATIONS RESEARCH INSTITUTE, Daejeon (KR)

(72) Inventor: Ho Young Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/207,673

(22) Filed: Jul. 12, 2016

(65) Prior Publication Data

US 2017/0270910 A1    Sep. 21, 2017

(30) Foreign Application Priority Data

Mar. 18, 2016 (KR) .......................... 10-2016-0032811

(51) Int. Cl.
*G10L 15/00* (2013.01)
*G10L 15/16* (2006.01)
(Continued)

(52) U.S. Cl.
CPC .............. *G10L 15/063* (2013.01); *G06N 3/04* (2013.01); *G06N 3/08* (2013.01); *G10L 15/02* (2013.01);
(Continued)

(58) Field of Classification Search
CPC ................................. G10L 15/00; G10L 15/16
(Continued)

(56) References Cited

U.S. PATENT DOCUMENTS 5,963,904 A    10/1999 Lee et al.
6,236,965 B1    5/2001 Kim et al.
(Continued)

FOREIGN PATENT DOCUMENTS

KR    10-0820723 B1    4/2008
KR    10-1326914 B1    11/2013

OTHER PUBLICATIONS

Dahl et al. "Context-dependent pre-trained deep neural networks for large-vocabulary speech recognition." IEEE Transactions on Audio, Speech, and Language Processing 20.1 (2012): 30-42.*
(Continued)

*Primary Examiner* — Seong Ah A Shin
(74) *Attorney, Agent, or Firm* — LRK Patent Law Firm

(57) ABSTRACT

A pre-training apparatus and method for recognition speech, which initialize, by layers, a deep neural network to correct a node connection weight. The pre-training apparatus for speech recognition includes an input unit configured to receive speech data, a model generation unit configured to initialize a connection weight of a deep neural network, based on the speech data, and an output unit configured to output information about the connection weight. In order for a state of a phoneme unit corresponding to the speech data to be output, the model generation unit trains the connection weight by piling a plurality of hidden layers according to a determined structure of the deep neural network, applies an output layer to a certain layer between the plurality of hidden layers to correct the trained connection weight in each of the plurality of hidden layers, thereby initializing the connection weight.

9 Claims, 4 Drawing Sheets

(51) Int. Cl.
*G10L 15/06* (2013.01)
*G10L 15/02* (2006.01)
*G06N 3/04* (2006.01)
*G06N 3/08* (2006.01)

(52) U.S. Cl.
CPC ........ *G10L 15/16* (2013.01); *G10L 2015/025* (2013.01)

(58) Field of Classification Search
USPC .................. 704/232, 236, 240; 706/14, 25
See application file for complete search history.

(56) References Cited

U.S. PATENT DOCUMENTS

| | | | |
|---|---|---|---|
| 7,734,555 B2 | 6/2010 | Lee et al. | |
| 8,862,527 B2* | 10/2014 | Garner | G06N 3/088 706/25 |
| 8,918,352 B2* | 12/2014 | Deng | G06N 3/08 382/157 |
| 9,153,231 B1* | 10/2015 | Salvador | G10L 15/065 |
| 9,460,711 B1* | 10/2016 | Vanhoucke | G10L 15/16 |
| 2010/0169256 A1 | 7/2010 | Lee et al. | |
| 2013/0138436 A1 | 5/2013 | Yu et al. | |
| 2014/0257803 A1* | 9/2014 | Yu | G06N 3/0481 704/232 |
| 2015/0161994 A1* | 6/2015 | Tang | G10L 15/02 704/232 |
| 2015/0170020 A1* | 6/2015 | Garimella | G06N 3/082 706/14 |
| 2016/0140956 A1* | 5/2016 | Yu | G10L 15/08 704/240 |
| 2017/0061330 A1* | 3/2017 | Kurata | G06N 99/005 |
| 2017/0194002 A1* | 7/2017 | Kim | G10L 15/30 |

OTHER PUBLICATIONS

Hinton et al. "Deep neural networks for acoustic modeling in speech recognition: The shared views of four research groups." IEEE Signal Processing Magazine 29.6 (2012): 82-97.*

Mohamed et al. "Understanding how deep belief networks perform acoustic modelling." Acoustics, Speech and Signal Processing (ICASSP), 2012 IEEE International Conference on. IEEE, 2012.*

* cited by examiner

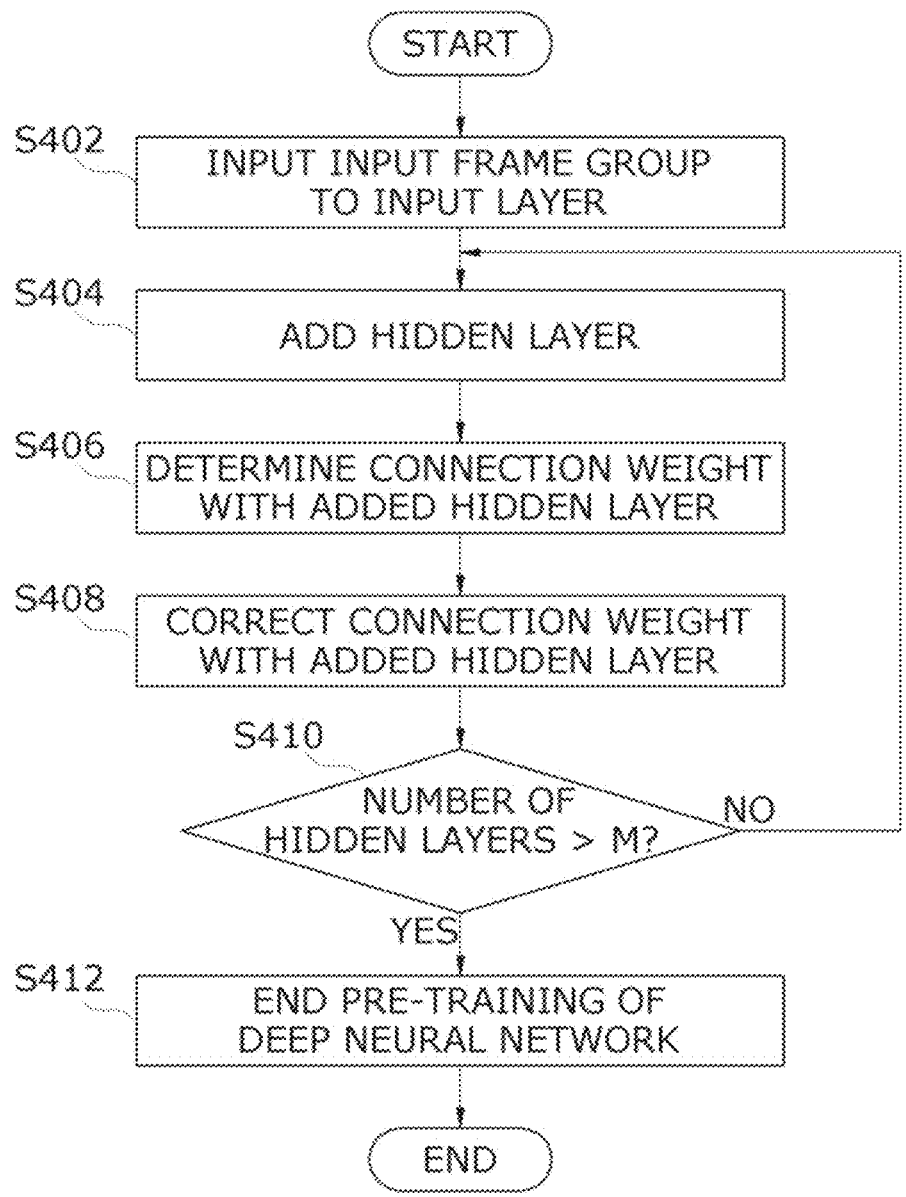

PRE-TRAINING APPARATUS AND METHOD FOR SPEECH RECOGNITION

CROSS-REFERENCE TO RELATED APPLICATIONS

This application claims priority under 35 U.S.C. §119 to Korean Patent Application No. 10-2016-0032811, filed on Mar. 18, 2016, the disclosure of which is incorporated herein by reference in its entirety.

BACKGROUND

1. Field of the Invention

The present invention relates to an apparatus and a method of developing an acoustic model among essential components of a speech recognition system, and more particularly, to a pre-training apparatus and method for speech recognition.

2. Description of Related Art

A related art speech recognition apparatus calculates a Gaussian distribution of each phoneme by using training speech data and phonetic transcription information corresponding to the training speech data.

The related art speech recognition apparatus based on the above-described method is easy to train and adapts to an environment at a high speed.

However, in the related art, if performance of the speech recognition apparatus reaches a certain level, an effect of improving performance of the speech recognition apparatus is small despite an increase in training data.

In order to solve the problem, a method of implementing an acoustic model by using a deep neural network is being used.

However, unless the amount of training speech data is infinite, determining an initial value of a node connection weight of the deep neural network greatly affects performance of the speech recognition apparatus.

SUMMARY

Accordingly, the present invention provides a pre-training apparatus and method for speech recognition, which initialize, by layers, a deep neural network to correct a node connection weight.

In one general aspect, a pre-training apparatus for speech recognition includes: an input unit configured to receive speech data; a model generation unit configured to initialize a connection weight of a deep neural network, based on the speech data; and an output unit configured to output information about the connection weight; wherein in order for a state of a phoneme unit corresponding to the speech data to be output, the model generation unit trains the connection weight by piling a plurality of hidden layers according to a determined structure of the deep neural network, applies an output layer to a certain layer between the plurality of hidden layers to correct the trained connection weight in each of the plurality of hidden layers, thereby initializing the connection weight.

In another general aspect, a pre-training method for speech recognition includes: receiving speech data; and initializing a connection weight of a deep neural network, based on the speech data, wherein the initializing of the connection weight includes, in order for a state of a phoneme unit corresponding to the speech data to be output, training the connection weight by piling a plurality of hidden layers according to a determined structure of the deep neural network, and applying an output layer to a certain layer between the plurality of hidden layers to correct the trained connection weight in each of the plurality of hidden layers, thereby initializing the connection weight.

Other features and aspects will be apparent from the following detailed description, the drawings, and the claims.

BRIEF DESCRIPTION OF THE DRAWINGS

FIG. 4 is a flowchart of a pre-training method for speech recognition, according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter.

The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
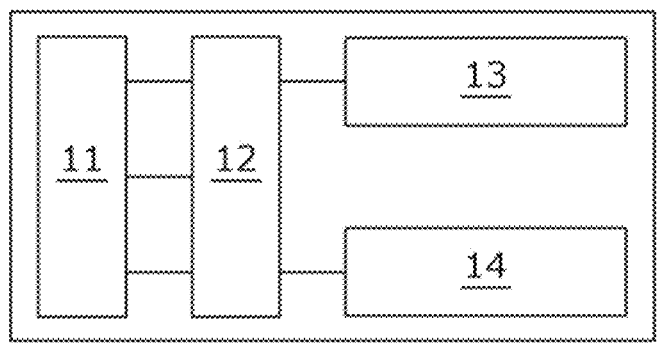
FIG. 1 is an exemplary diagram illustrating a configuration of a pre-training apparatus for speech recognition according to an embodiment of the present invention.

FIG. 1 is an exemplary diagram illustrating a configuration of a pre-training apparatus for speech recognition according to an embodiment of the present invention.

In improving speech recognition performance, an acoustic model is one of important components. The acoustic model is for the purpose of training a method of distinguishing a speech in unit of one phoneme by using a large amount of speech data.

A related art representative acoustic model training method calculates a Gaussian distribution of each phoneme by using training speech data. The related art acoustic model training method is high in model training speed, uses a method of changing the Gaussian distribution depending on an environment, and quickly adapts to the environment. However, if performance of an apparatus based on the method reaches a certain level, performance of the apparatus is saturated despite an increase in training data.

As a method for solving the problem, technology for generating an acoustic model by using a deep neural network has been recently proposed.

An important component in training an acoustic model by using a deep neural network is a method of determining an initial value of a node connection weight of the deep neural network.

If training speech data is infinite, performance of an acoustic model slightly depends on an initial value of a node connection weight of a deep neural network. However, when securing of the training speech data is limited, the performance of the acoustic model is improved through an effective method of determining the initial value of the node connection weight of the deep neural network.

Therefore, the present invention proposes an apparatus and a method for improving performance of an acoustic model including a deep neural network structure.

Particularly, the present invention relates to a method of initializing a deep neural network which effectively trains a distinguishable feature from training speech data (hereinafter simply referred to as speech data) in training an acoustic model for speech recognition.

Based on a deep neural network, provided is an acoustic model which trains aspects of various speech signals as speech data increases, and is higher in performance than a Gaussian-based training method.

The most fundamental method of training a deep neural network initializes a node connection weight and then updates the node connection weight so as to obtain an output corresponding to training speech data. If training speech data is infinite despite a random initial value being set, the deep neural network is trained to obtain a desired output.

However, when infinite data is not secured or development of a service system is at an initial stage, it is difficult to secure massive data associated with a service domain. Therefore, a method of initializing a node connection weight is needed for maximizing training of a neural network by using limited speech data. Accordingly, the present invention proposes a method of initializing a node connection weight of a deep neural network so as to maximize performance of an acoustic model.

The pre-training apparatus for speech recognition according to an embodiment of the present invention, as illustrated in FIG. 1, may include an input unit 11 that receives various data, a storage unit 13 that stores various programs, a model generation unit 12 that processes the data input through the input unit 11 by using the programs to initialize a node connection weight of a deep neural network structure for an acoustic model, and an output unit 14 that outputs a result obtained through processing by the model generation unit 12.

The acoustic model pre-training apparatus having the deep neural network structure for speech recognition may be configured with, for example, a personal computer (PC).

The input unit 11 may perform communication over a wired network or a wireless network to receive various speech data, receive various speech data from a storage medium such as a universal serial bus (USB) or the like, or receive various control data through a keyboard, a scanner, or the like. Also, the input unit 11 may directly receive a speech and may convert the speech into digital data, namely, speech data.

The output unit 14 may include a monitor, a storage medium, a printer, and/or the like.

Figure 2:
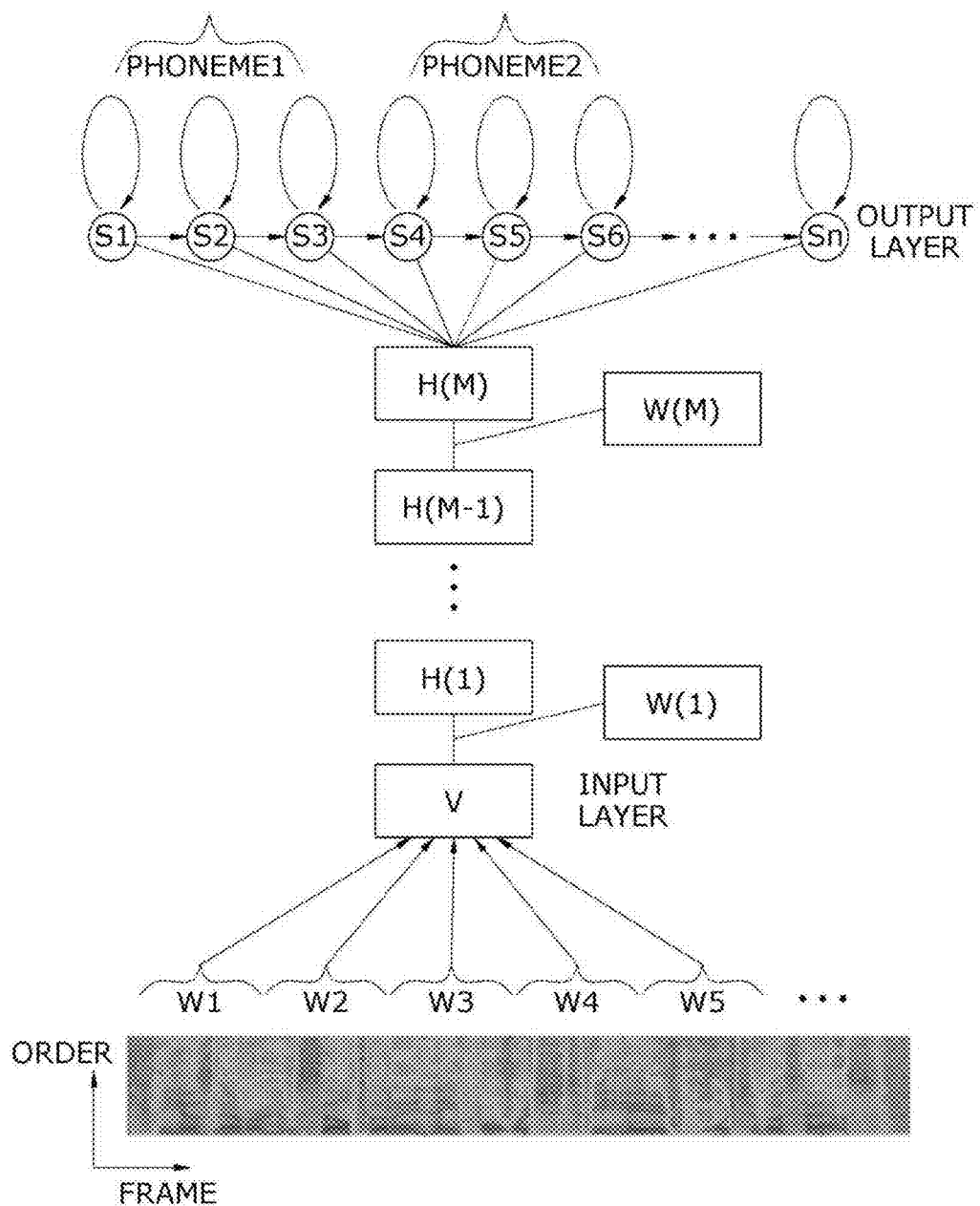
FIG. 2 is an exemplary diagram illustrating a structure of an acoustic model based on a deep neural network applied to the present invention.

FIG. 2 is an exemplary diagram illustrating a structure of an acoustic model based on a deep neural network applied to the present invention, and particularly, is an exemplary diagram schematically illustrating a method of configuring an acoustic model by using a deep neural network.

First, as illustrated in FIG. 2(a), input speech data may be converted into a spectrum at every certain time and in unit of one frame having a predetermined length. The speech data may be input through the input unit 11.

Subsequently, a filter bank vector having an arbitrary order may be extracted from a spectrum of each frame. The filter bank vector may be a frame feature vector, and a plurality of frame feature vectors may be grouped and may be used as an input of a deep neural network as illustrated in FIG. 2(b).

The deep neural network (b) may be configured in a form where a plurality of layers are piled. For example, a plurality of hidden layers H(1) to H(M) may be piled on an input layer V to which the frame feature vector is input, thereby configuring the deep neural network.

When a frame feature vector corresponds to a fortieth order and fifteen frames are grouped and input to the deep neural network, a set (hereinafter simply referred to as an input frame group) of frame feature vectors configuring the fifteen frames may have 600 input parameters, and thus, the input layer V may be configured with 600 nodes.

A first hidden layer H(1) may be configured with arbitrary n number of nodes, and the first hidden layer H(1) may include 600×n number of node connections where the 600 nodes of the input layer V are all connected to the n nodes. A weight of each of the nodes may be determined through training. The hidden layers may be configured based on the above-described principle, and a last hidden layer may become an output layer.

The output layer may depend on the number of phoneme units configuring an acoustic model, and for example, when each of 1000 phoneme units are modeled to three states, the output layer may have 3000 nodes allocated to 3000 states.

In training an actual acoustic model, 600 parameters of the input frame group may be used as an input of the input layer V, and each of the parameters and a connection weight may be multiplied. A node-based value in the first hidden layer H(1) may be calculated by a method of summating values obtained through multiplication in all connections, for each of the nodes of the first hidden layer H(1). Such a process may be repeatedly performed up to an output layer, and thus, values of all nodes of the output layer may be calculated.

Based on transcription information about which state of which phoneme the input frame group corresponds to, a weight of the input frame group may be updated in order for a node value of the output layer corresponding to the state to be the maximum. Through such a method, the acoustic model may be trained by using the deep neural network.

In training the acoustic model based on the deep neural network, an important component may be an operation of determining an initial value of a node connection weight of a deep neural network.

In a related art acoustic model based on a Gaussian model, an average and a distribution of phonemes may be calculated to initialize the acoustic model as one Gaussian model, and the acoustic model may extend to a multi-Gaussian model and thus may be trained. However, in an acoustic model based on a deep neural network, it is difficult to determine which node connection weight is a significant weight among all node connection weights of a deep neural network for an input frame feature vector.

Therefore, in training a related art acoustic model based on a deep neural network, a weight may be initialized as a random value and used. In such a method, if training data is infinite, a connection weight capable of being distinguished for each phoneme may be trained by repeating training a plurality of times, thereby obtaining an acoustic model.

However, it is not easy to secure infinite speech data. Also, even in a case where a speech recognition system for a new service has been developed, the new service cannot be started with infinite speech data suitable for a new service environment. For this reason, it is required to develop technology for initializing a node connection weight of a deep neural network.

A related art method of initializing a node connection weight of a deep neural network generally uses a method where one layer is trained, a hidden layer is piled on the trained layer, and another hidden layer is piled thereon. An operation of sequentially determining an initial value of a node connection weight by piling layers may be referred to as pre-training. Also, by using the determined initial value of the node connection weight, an operation of training an acoustic model so as to output a state of a phoneme corresponding to an input frame group may be referred to as elaboration training.

An initial value in pre-training may be very important in order for an elaboration training operation to be fast performed and to have good performance.

Therefore, the present invention proposes a new pre-training operation of determining an initial value of a deep neural network.

A pre-training method which is much used at present is a deep belief network. The pre-training method may include an operation of training and piling by ones hidden layers.

First, in FIG. 2, the pre-training method may train a first connection weight W1 between the input layer V and the first hidden layer H(1) by using a maximum entropy method.

Subsequently, the pre-training method may calculate the first hidden layer H(1) by using the input layer V and the first connection weight W1, pile a second hidden layer H(2) on the first hidden layer H(1), and train a second connection weight W2 between the first hidden layer H(1) and the second hidden layer H(2).

Subsequently, the pre-training method may repeatedly perform the above-described operation up to a last hidden layer H(M) to train connection weights between the hidden layers, and may set each of the connection weights to an initial value.

Subsequently, in order to configure an acoustic model, the pre-training method may pile an output layer having a node matching a state of a phoneme unit and may update connection weights of all layers by using an error backpropagation algorithm in order for a corresponding node in the output layer to have a maximum value according to phoneme information corresponding to an input frame group. Such an operation may be referred to as an elaboration training operation.

Finally, the pre-training method may perform the elaboration training operation on all speech data, thereby allowing weight training to converge.

To provide an additional description, first, the related art pre-training method trains the first connection weight W1 by using a maximum entropy method in order for the first hidden layer H(1) to express characteristic of an input frame group between the input layer V and the first hidden layer H(1), thereby determining an initial value of the first connection weight W1. Subsequently, the relate art pre-training method piles the second hidden layer H(2) on the first hidden layer H(1), and in this case, the first hidden layer H(1) becomes an input for training the second connection weight W2 between the first hidden layer H(1) and the second hidden layer H(2), and each node of the first hidden layer H(1) has an average value of weights of all paths connected thereto. Also, the related art pre-training method trains the second connection weight W2 between the first hidden layer H(1) and the second hidden layer H(2) by using the maximum entropy method. Such an operation is repeatedly performed up to the last hidden layer H(M), thereby determining an initial value of a connection weight.

The related art pre-training method based on a deep belief network has a problem in that a hidden layer is trained, another hidden layer is piled on the trained hidden layer, and an upper hidden layer is trained separately from a hidden layer thereunder. That is, the pre-training method uses a structure where all nodes of a deep neural network are connected to each other, but ignores a connection path successive to a lower layer.

That is, when the input layer includes 600 nodes and the first hidden layer H(1) includes 600 nodes, the first connection weight W1 between the input layer V and the first hidden layer H(1) consists of a 600×600 matrix.

In this case, when the second hidden layer H(2) including 600 nodes is piled on the first hidden layer H(1), a connection path between the input layer V and the first hidden layer H(1) is 600×600×600, and thus, the second connection weight W2 should be trained in consideration of 2,160,000,000.

However, such a method needs a number of arithmetic operations. Therefore, in training the second connection weight W2, the pre-training method fixes a connection path between the input layer V and the first hidden layer H(1) with no consideration of all connection paths between the input layer V and the first hidden layer H(1) and considers only a connection path between the first hidden layer H(1) and the second hidden layer H(2).

For example, one node of the first hidden layer H(1) may have only an average value of 600 connection weights instead of a value based on all of 600 weights connected to 600 nodes of the input layer V.

Therefore, in an operation of training the second connection weight W2, the related art pre-training method trains the second connection weight W2 for 600×600 connection paths with the 600 nodes of the second hidden layer H(2) by using an average value of one of the 600 nodes of the first hidden layer H(1).

Figure 3:
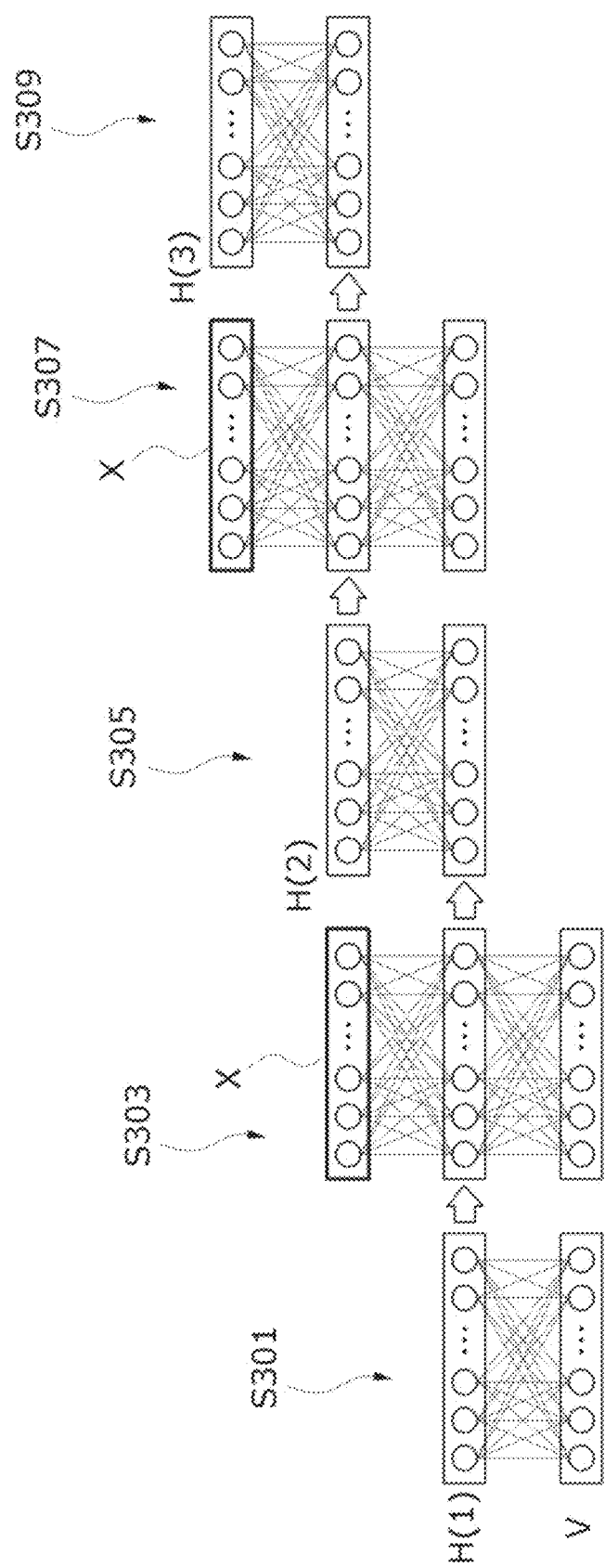
FIG. 3 is an exemplary diagram schematically illustrating a pre-training method of a deep neural network for speech recognition, according to an embodiment of the present invention.

FIG. 3 is an exemplary diagram schematically illustrating a pre-training method of a deep neural network for speech recognition, according to an embodiment of the present invention. FIG. 4 is a flowchart of a pre-training method for speech recognition, according to an embodiment of the present invention. Particularly, FIG. 3 illustrates a pre-training method in a deep neural network for an acoustic model.

The present invention improves the related art acoustic model training method based on a deep belief network by using the pre-training method illustrated in FIGS. 3 and 4.

Particularly, the present invention proposes a method that does not consider all paths between piled hidden layers, but enables an average value of connection weights of each node of a lower layer to have a more significant value when piling a new layer on one layer.

The present invention optimizes a connection weight through a correction operation which performs a supervised learning operation of allowing a state of a phoneme unit corresponding to an input frame group to be output as in an output layer after an unsupervised learning operation of training a connection weight for each layer.

The initial value of the connection weight of the hidden layer calculated through the above-described operation may have a value which is more significant to express a final phoneme unit. Also, in a case of performing training by piling a new layer on a certain layer, all connection paths are not considered, but according to the above-described operation, an effect closer to a case of considering all paths is obtained.

Hereinafter, the pre-training method for speech recognition according to an embodiment of the present invention will be described in detail with reference to FIGS. 3 and 4.

First, in step S402, the model generation unit 12 may convert speech data, input through the input unit 11, into a frame feature vector and may input an input frame group, which is a set of frame feature vectors configuring two or more frames, to the input layer V.

Subsequently, the model generation unit 12 may pile the first hidden layer H(1) on the input layer V in step S404, and may determine the first connection weight W1 between the input layer V and the first hidden layer H(1) piled on the input layer V, based on the maximum entropy method in step S406 and S301. That is, the model generation unit 12 may determine the first connection weight W1 through training.

Subsequently, the model generation unit 12 may pile an output layer X on the first hidden layer H(1) and may correct the first connection weight W1 in order for a state of a phoneme unit corresponding to the input frame group to be output in step S408 and S303. That is, the model generation unit 12 may correct in detail the first connection weight W1.

Subsequently, after correcting the first connection weight W1, the model generation unit 12 may remove the output layer X, and pile the second hidden layer H(2) on the first hidden layer H(1) in step S404. Also, the model generation unit 12 may calculate a value of each node of the first hidden layer H(1) by using the first connection weight W1 and then may determine the second connection weight W2 between the first hidden layer H(1) and the second hidden layer H(2) in step S406 and S305. That is, the model generation unit 12 may determine the second connection weight W2 through training.

Subsequently, the model generation unit 12 may pile the output layer X on the second hidden layer H(2) and may correct the second connection weight W2 in order for the state of the phoneme unit corresponding to the input frame group to be output in step S408 and S307. That is, the model generation unit 12 may correct in detail the second connection weight W2.

Finally, the model generation unit 12 may perform the above-described operation on the third hidden layer H(3) to the last hidden layer H(M) to initialize a connection weight in each of the hidden layers in step S410 and S309. Here, initializing a connection weight denotes an operation of correcting the connection weight through the above-described operation to calculate a connection weight optimized for all speech data applied to training. Also, the pre-training of the deep neural network may end in step S412.

In the related art, an operation of generating a structure of deep neural network by piling hidden layers uses a method of expressing characteristic of data by using an output value of a lower layer as an input value of an upper layer. On the other hand, the present invention may apply an output layer directly matching a state of a phoneme unit between layers to substantially output a state of a phoneme unit corresponding to input data, thereby correcting (i.e., optimizing) a connection weight. Through such an optimization operation, the connection weight may be initialized.

Moreover, in generating a state of deep neural network by piling hidden layers, the present invention may apply an output layer to each hidden layer to correct (i.e., optimize) a connection weight of the hidden layer. Also, the present invention may remove the output layer, pile another hidden layer on a corresponding layer, and apply the same output layer to the other hidden layer to correct (i.e., optimize) a connection weight of the other hidden layer. Also, the present invention may repeatedly perform the above-described operation on a next hidden layer to a last hidden layer to correct (i.e., optimize) a connection weight of each hidden layer. Through such an optimization operation, the connection weight may be initialized.

The present invention proposes an effective apparatus and method which initialize node connection weight of a deep neural network in developing an acoustic model for speech recognition by using the deep neural network. Therefore, the present invention maximizes performance of the acoustic model even in an environment where limited training speech data is provided. That is, the present invention improves performance of speech recognition using the acoustic model based on the deep neural network.

It is not easy to infinitely secure training speech data for an acoustic model, and it is difficult to calculate a large amount of actual speech data in a service domain in developing a new service. Accordingly, the present invention proposes an apparatus and a method which maximally train a deep neural network by using an appropriate amount of training data.

The present invention optimizes a pre-training process for a deep neural network, thereby maximizing performance of an acoustic model based on the deep neural network for speech recognition.

According to the present invention, even when training speech data is not sufficient at a stage of developing a new service, a deep neural network is optimally initialized in a speech recognition system including an acoustic model based on the deep neural network.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pre-training apparatus for speech recognition, the pre-training apparatus comprising:
 a memory and at least one processor coupled to the memory;
 a set of units configured to pre-train a deep neural network, the set of units comprising:
 an input unit configured to receive speech data;
 a model generation unit configured to initialize a connection weight of a deep neural network, based on the speech data; and
 an output unit configured to output information about the connection weight;
 wherein in order for a state of a phoneme unit corresponding to the speech data to be output, the model generation unit trains the connection weight by piling a plurality of hidden layers according to a determined structure of the deep neural network, applies an output layer to a certain layer between the plurality of hidden layers to correct the trained connection weight in each of the plurality of hidden layers, thereby initializing the connection weight, wherein when generating a structure of deep neural network by piling a plurality of hidden layers, the model generation unit applies the output layer to one hidden layer to correct a connection weight of the one hidden layer, removes the output layer, piles another hidden layer, applies the output layer to the other hidden layer to correct a connection weight of the other hidden layer, sequentially performs the application and correction on a next hidden layer to a last hidden layer to correct a connection weight of each of the hidden layers subsequent to the other hidden layer, thereby initializing the connection weight.

2. The pre-training apparatus of claim 1, wherein the output layer is used for speech recognition directly matching a state of each of a plurality of phoneme units.

3. The pre-training apparatus of claim 1, wherein the model generation unit initializes a first connection weight between the input layer, to which the speech data is input, and a first hidden layer piled on the input layer by using the output layer, initializes a second connection weight between the first hidden layer and a second hidden layer piled on the first hidden layer by using the output layer, and sequentially performs the initialization on a next hidden layer to a last hidden layer to initialize a connection weight of each of hidden layers subsequent to the second hidden layer.

4. The pre-training apparatus of claim 3, wherein the model generation unit converts the speech data into a frame feature vector, inputs an input frame group, which is a set of frame feature vectors configuring two or more frames, to the input layer, determines the first connection weight between the input layer and the first hidden layer piled on the input layer by using a maximum entropy method, piles the output layer on the first hidden layer, and corrects the first connection weight in order for a state of a phoneme unit corresponding to the input frame group to be output, thereby initializing the first connection weight.

5. The pre-training apparatus of claim 4, wherein in order to initialize a second connection weight, the model generation unit corrects the first connection weight, removes the output layer, piles a second hidden layer on the first hidden layer, calculates a value in each of nodes of the first hidden layer by using the first connection weight, determines the second connection weight between the first hidden layer and the second hidden layer piled by using the maximum entropy method, piles the output layer on the second hidden layer, and corrects the second connection weight in order for the state of the phoneme unit corresponding to the input frame group to be output.

6. The pre-training apparatus of claim 1, wherein the input unit performs communication over a wired network or a wireless network to receive the speech data, receives the speech data from a storage medium, or directly receives a speech and digitalizes the speech to convert the speech into speech data.

7. A computer-implemented pre-training method for speech recognition, the computer implemented pre-training method comprising:

receiving speech data in an input unit; and initializing a connection weight of a deep neural network using at least one processor, based on the speech data, wherein the initializing of the connection weight comprises, in order for a state of a phoneme unit corresponding to the speech data to be output, training the connection weight by piling a plurality of hidden layers according to a determined structure of the deep neural network, and applying an output layer to a certain layer between the plurality of hidden layers to correct the trained connection weight in each of the plurality of hidden layers, thereby initializing the connection weight, wherein the initializing of the connection weight further comprises:

when generating a structure of deep neural network by piling a plurality of hidden layers, applying the output layer to one hidden layer to correct a connection weight of the one hidden layer;

removing the output layer and piling another hidden layer;

applying the output layer to the other hidden layer to correct a connection weight of the other hidden layer; and sequentially performing the applying and correcting on a next hidden layer to a last hidden layer to initialize a connection weight of each of the plurality of hidden layers.

8. The pre-training method of claim 7, wherein the initializing of the connection weight comprises:

initializing a first connection weight between the input layer, to which the speech data is input, and a first hidden layer piled on the input layer by using the output layer;

initializing a second connection weight between the first hidden layer and a second hidden layer piled on the first hidden layer by using the output layer; and sequentially performing the initialization on a next hidden layer to a last hidden layer to initialize a connection weight of each of hidden layers subsequent to the second hidden layer.

9. The pre-training method of claim 8, wherein the initializing of the first connection weight comprises:

converting the speech data into a frame feature vector, inputs an input frame group, which is a set of frame feature vectors configuring two or more frames, to the input layer;

determining the first connection weight between the input layer and the first hidden layer piled on the input layer by using the maximum entropy method; and piling the output layer on the first hidden layer and correcting the first connection weight in order for a state of a phoneme unit corresponding to the input frame group to be output.

* * * * *